United States Patent [19]

Szabó

[11] Patent Number: 4,544,127
[45] Date of Patent: Oct. 1, 1985

[54] BISTABLE VALVE

[75] Inventor: Zsolt Szabó, Budapest, Hungary

[73] Assignee: Labor Muszeripari Muvek, Hungary

[21] Appl. No.: 561,560

[22] Filed: Dec. 14, 1983

[51] Int. Cl.$^4$ ............................................ F16L 55/14
[52] U.S. Cl. .......................................... 251/9; 251/4; 251/75; 137/636
[58] Field of Search ............................ 251/5, 9, 75, 4; 137/636, 636.1

[56] References Cited

U.S. PATENT DOCUMENTS

| | | | |
|---|---|---|---|
| 485,698 | 11/1892 | Ketchum | 251/9 X |
| 3,635,251 | 1/1972 | Gaines | 137/636 |
| 3,861,421 | 1/1975 | Thompson | 251/9 X |
| 3,918,490 | 11/1975 | Goda | 137/597 |
| 4,328,834 | 5/1982 | Oates, Sr. et al. | 137/636.1 |
| 4,372,345 | 2/1983 | Mehus | 137/636 |

Primary Examiner—Samuel Scott
Assistant Examiner—Allen J. Flanigan
Attorney, Agent, or Firm—Handal & Morofsky

[57] ABSTRACT

A bistable valve construction for alternately clamping flexible pipes with a closure member (1) having two closure edges (1a and 1b) which lie parallel with respect to each other, and which depending from the position of the closure member (1) will exert alternately pressure on the pipes, and wherein the flipping of the closure member into one or the other limiting closing position is performed by a biasing flipband (2) of a leaf-type construction.

1 Claim, 4 Drawing Figures

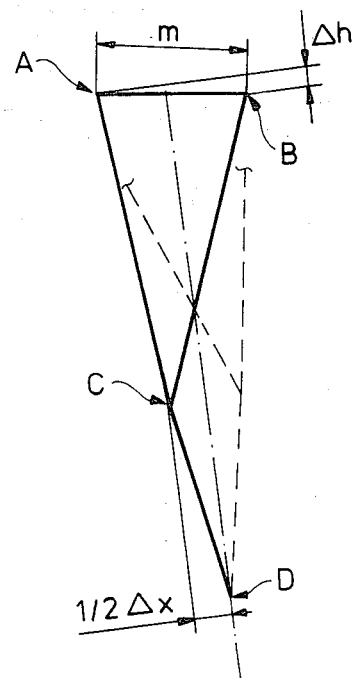
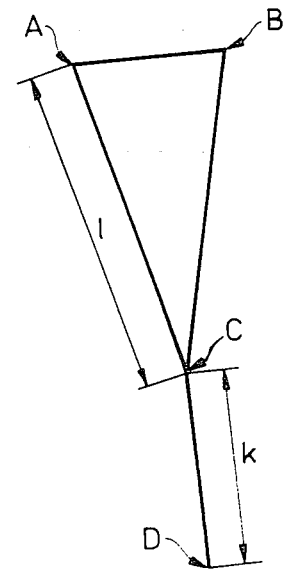
Fig. 3/a
Fig. 3/b

BISTABLE VALVE

FIELD AND BACKGROUND OF THE INVENTION

The invention relates to a bistable valve for the alternate closing of flexible pipes which in spite of its simple construction can be operated by short pulses and is capable of assuring that at the midpoint of the switching, both of the pipes are closed.

The above-noted advantageous characteristics can be accomplished by an appropriate construction of the closure member and its forced path of movement.

The closure member of the bistable valve according to the invention is provided with a pair of parallel closure edges which, depending from the position of the closure member, exert alternately pressure on the pipes by the fact that the opposite side of the closure member is moved over an appropriately selected arch.

There are known pipe clamps which are operable with the help of various mechanical and electromagnetic means, and in which the power necessary for the operation should be exerted directly against the flexible pipe. A switching valve which operates with such mechanism possesses various disadvantages.

In one aspect, in order to retain the limiting positions, a constant loading of the operating mechanism is necessary, consequently, in the case of electromagnetic operation, there is need for a large coil and for a constant consumption of energy. On the other hand, it is difficult to assure that in the transient position both pipes be closed, which in the use of switching valves is a necessary requirement.

SUMMARY OF THE INVENTION

The clamping or closure mechanism of the present invention will eliminate the above-noted disadvantages in that in the case of closing either of the pipes, that is, in both of its limiting positions, it is in a mechanically stable position, therefore, after the switching has taken place, there is no need for supplying an outside force and, in addition, such construction is also easily realizable, wherein the opening of the closed pipe section will occur only after the closing of the other pipe.

BRIEF DESCRIPTION OF THE DRAWINGS

The invention will become more readily apparent from the following description of a preferred embodiment thereof shown, by way of example in the accompanying drawings, in which:

FIGS. 3a and 3b illustrate the optimum characteristics and of the flipband in a schematic fashion.

DESCRIPTION OF THE PREFERRED EMBODIMENT

Figure 1:
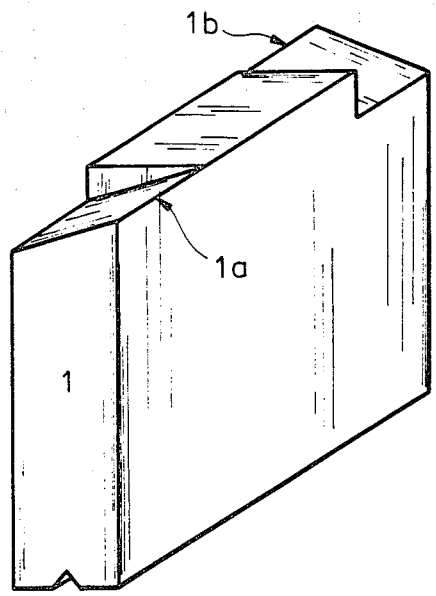
FIG. 1 illustrates the closure member according to the present invention.
Figure 2:
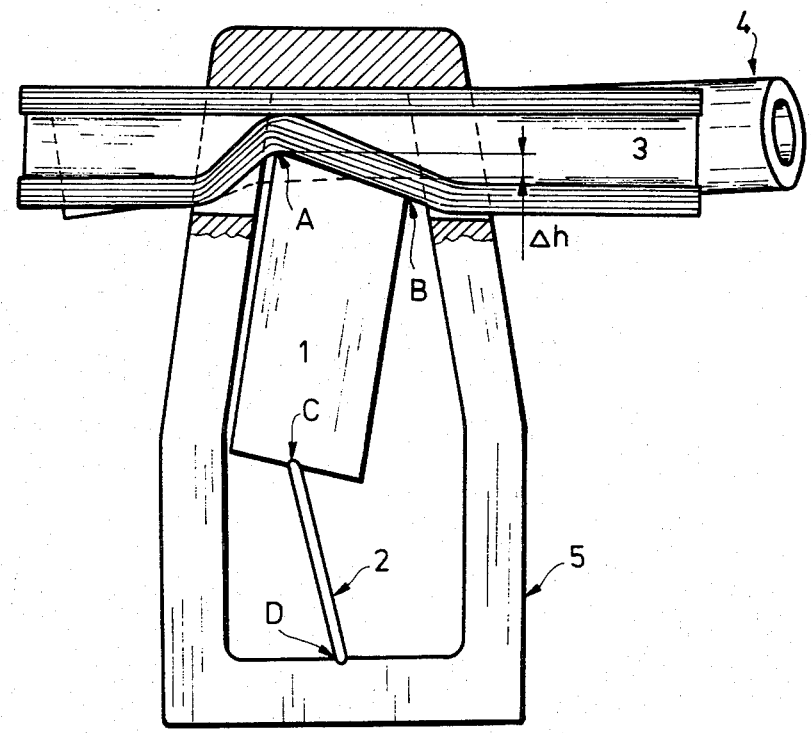
FIG. 2 illustrates the closure member in a valve housing.

The valve according to the invention comprises two moving parts: a closure member 1 and a compressive leaf spring-type flip band 2, which are placed in a valve housing 5 shown in FIG. 2 which is coupled to pipes 3, 4. The housing 5 as can be seen in FIG. 2 is wide enough to accommodate the closure member 1 at both its limiting positions shown in FIGS. 3a and 3b. The construction of the closure member 1 illustrated in FIG. 1 and the selection of appropriate dimensions will meet the requirements made to the operation of the valve herein. With reference to FIG. 1, it is seen that the closure member 1 is provided with a pair of closing edges 1a and 1b which are parallel with respect to each other, and which continue over into a slanted roof-like portion which assures that one closing edge will close only one or the other pipe.

The scope of the invention extends to such constructional variation, wherein only one of the pipes should be closed, or where one closing edge will perform the closing of several pipes simultaneously, or wherein the closing edges following each other in various configurations. Similarly, the scope should extend to a constructional form wherein the closing edges in performing the above noted functions, are shaped, for example, from sheet material.

The optimum characteristics of the closure member 1 and of the flip band will be discussed later in connection with FIG. 3.

The valve illustrated in FIG. 2 operates as follows:

The valve housing 6 must be dimensioned in such a manner that the appropriate pipes in the two limiting positions must be kept closed. During this, the other closing edge in both situations will release on a distance of ($\Delta h$) the clamping action on the other pipe, and will free an appropriate length of pipe cross-section. The movement of the closure member 1 should be limited to such an extent that its point (c) in both limiting positions should lie slightly outside the triangle (A-D-B), where D corresponds to the point of projection of the flip band 2, while A and B are points of projections of the closure edges 1a and 1b, respectively.

The optimal dimensions of the construction is illustrated in FIGS. 3a and b. There, ($\Delta h$) represents the height of opening of the valve, ($\Delta x$) represents the region of movement of the journal point (c) between the closure member 1 and the tensioning flip band 2, (m) represents the distance between the closing edges 1a and 1b, (l) represents the length of the closure member 1, (k) represents the length of the flip band 2. The extension of the valve into the third direction, which is not illustrated in the figures, can be selected according to the particular need. FIG. 3b illustrates the disposition of the characteristic lines of the valve in the intermediate position between the two limiting positions.

On the basis of the illustrations of FIGS. 3a and 3b, the valve can be constructed with such optimum dimensions which will enable also the simultaneous closing of both pipes.

EXAMPLE

On the basis of our calculations and experiments, for a general laboratory use we have found an electromagnetically operated valve as being the most suitable, which has the following dimensions:

h=0.4 mm
x=2–2.5 mm
m=5–6 mm
l=9–12 mm
k=6–7 mm

A bistable valve constructed according to the above dimensions, together with the pulling magnets require a volume of 20×20×50 mm, and for its flip-flop action a pulse of 100 ms at 10 V was necessary.

I claim:

1. A bistable valve construction for alternately clamping at least one of at least two parallel flexible hoses, comprising a housing having a compression surface, a closure member disposed in said housing, and a biasing means; said closure member having a first end which has two closure edges disposed on it, one on either side of said first end, said closure edges being parallel and offset with respect to each other; said closure member having a second end; said flexible pipes being disposed between said compression surface and said first end of said closure member; said biasing means acting on said second end to bias it in a direction generally towards said compression surface; said closure member being constrained by said biasing means in cooperation with said housing for angular motion between two extreme positions such that said first end is substantially stationary and is promixate said compression surface, while said second end moves generally along an arc centered at said first end; whereby when said closure member is in one of its extreme position, at least one of said at least two parallel flexible pipes is clamped against said compression surface by one of said closure edges to prevent flow therethrough while flow is permitted in at least one other of said at least two flexible pipes; and when said closure member is in its other extreme position, the other of said closure edges clamps said at least one other flexible pipe against said compression surface to prevent flow therethrough while flow is permitted in said at least one flexible pipe; and whereby, as said closure member is switched from one extreme position to the other, flow is not permitted in said at least one flexible member until said at least one other flexible pipe is firmly clamped against said compression surface by said other closure edge.

* * * * *